Aug. 31, 1954    O. B. WHITAKER ET AL    2,688,130
RADAR PILOT
Filed Dec. 7, 1949    3 Sheets-Sheet 3

INVENTORS
OMAR B. WHITAKER
FRANCIS WEST, JR.
BY
Herbert H. Thompson
their ATTORNEY Patented Aug. 31, 1954

2,688,130

UNITED STATES PATENT OFFICE 2,688,130

RADAR PILOT

Omar B. Whitaker, Great Neck, and Francis West, Jr., Westbury, N. Y., assignors to The Sperry Corporation, a corporation of Delaware Application December 7, 1949, Serial No. 131,622

6 Claims. (Cl. 343—5)

This invention relates to an improvement in automatic steering devices for ships, generally known as automatic pilots by which radar may be effectually incorporated in such pilot, so that automatic steering may be used with safety and surety not only on the high seas, but in harbors and rivers where it is just as necessary for information to be received by the automatic pilot of the location and proximity of the shore line, buoys and other vessels, as it is to know the true course of the vessel.

One of the first navigation instruments was the magnetic compass which has been supplemented by the gyro compass, and one of the more recent navigational aids is radar. Intermediate to these two great advances in the navigation art have been other important navigational aids, one of which has been automatic steering apparatus.

The present invention combines and integrates all three of the above-mentioned navigational aids and adapts and interconnects each to the other for their greatest mutual cooperation and efficiency. In order to fully appreciate the present invention, we will first briefly define the basic components, namely, the compass, automatic steering apparatus, and navigational radar.

By the term "compass" as used herein, we include not only the ordinary magnetic compass but also various types of earth inductor compasses including the so-called flux valve or flux gate compass. We also include the gyro compass which has largely superseded the magnetic compass in marine vessels and the later combination between the magnetic compass and gyroscope known as the gyro-magnetic compass or Gyrosyn. The term "compass" as used in this specification is intended to include any or all of such various forms of meridianal indicators.

Automatic steering apparatus have been developed which generally provide servo mechanisms responsive to the ship's deviation from a set course and which actuate the rudder to keep the ship on a prescribed course despite wind and high seas. Properly designed automatic steering apparatus is much more effective in holding a prescribed course than a human helmsman.

Radar is a recently developed navigational aid. It transmits directional high frequency electromagnetic energy which is reflected by surrounding objects and received again by the radar. These received reflections may be utilized to provide a representation of the surrounding locality. The most useful presentation for navigation purposes is the P. P. I. or Plan Position Indicator, which provides a representation of the surrounding locality in polar coordinates, that is, the azimuth angle and range.

There are two types of P. P. I. presentation for craft navigation, namely, "Relative" bearing presentation and "True" bearing presentation. In the "Relative" presentation on a radar cathode ray tube indicator, the ship's heading always appears at the top of the cathode ray tube i. e. at the zero reference angle position on the tube circumference. Therefore, the azimuth angle of all objects shown on the presentation is read "relative" to the ship's keel. Since the cathode ray tube has a fixed position relative to the ship, the picture rotates on the tube face, when the ship turns.

In the "True" bearing presentation, the representation of the surrounding objects is stabilized so that true North is always at the top of the tube circumference as viewed by the observer. Therefore, all azimuth angles are measured in degrees from the top of the tube circumference in a clockwise direction. The "True" presentation is made possible by interconnecting the vessel's gyro or other compass with the radar system to compensate for changes in the vessel's heading. The "True" presentation is advantageous because the picture of representation does not move on the cathode ray tube as the craft heading is changed, thereby providing a clear, definite picture and avoiding blurring. The present invention is shown utilized with the "True" presentation, but it may also be used with the "Relative" presentation.

Conventional marine navigation utilizing radar generally requires at least two men, an officer to conn the vessel from radar indication, and a man to execute the conning instructions. Where two or more men are employed in the wheel house, the standard procedure when targets are detected on the radar, is for the officer at the radar to determine what action should be taken and give instructions to the helmsman. The helmsman then turns the wheel to bring the vessel to the desired course as observed on a gyro-compass repeater.

It can easily be seen that where two or more human operators must combine and evaluate information from several separate sources to perform the single objective of directing the ship, there are many possibilities of error in determining, or verbally transmitting the instructions.

A mistake on the part of any of the operators either in reading an instrument, performing a mental calculation or evaluation, or transmitting or receiving a verbal order, may result in a dangerous situation. What is also important is that a mistake is ordinarily difficult to recognize or check.

The present invention combines the radar, the compass, and automatic steering apparatus into a single control-indictor, whereby all necessary information is automatically and continuously presented on a single indicator, where one operator can visually and directly interpret it. In addition, the course selector of the automatic steering apparatus is superimposed on the combined radar indicator so that a single operator may, by turning a single knob, set his desired course and change it at will.

The navigator then has before him all the radar information, and all the compass information, including the ship's heading and the proposed new course, plus their relation to surrounding objects. All intervening mental calculations and evaluations are avoided, as well as all verbal orders and communications between different operators. All the information is automatically and continuously presented on a single indicator. A single operator can easily interpret it and set in his new course order which is also indicated. The entire situation is then still before him and may be continuously checked. Any error will be immediately apparent.

Accordingly, a principal object of the invention is to integrate and adapt existing craft navigation apparatus including radar, compass, and automatic steering equipment so that information from these separate equipments may be presented on a single indicator, which indicator shall be adapted to provide automatic steering control.

Another object of the invention is to provide, on one indicator, combined information from radar, compass, and automatic steering apparatus in a simple manner, so that the net results of such information may be easily interpreted and used by an operator.

Another object of the invention is to provide a single control instrument for vessel navigation which synthesizes the necessary information for navigation control, and provides that control by a single adjustment without intervening mental activity on the part of one or more human operators.

Another object of the invention is to present to the navigator a complete set of information from various sources in a convenient form, and to provide control means integrally connected with this centralized indicator so that the navigator may easily and quickly make course changes of any magnitude, as well as being advised on how faithfully the change orders are being automatically performed.

Another object of the invention is to provide improved craft navigation and automatic steering apparatus.

These and other objects will be apparent from the following specification and figures of which:

Figure 1:
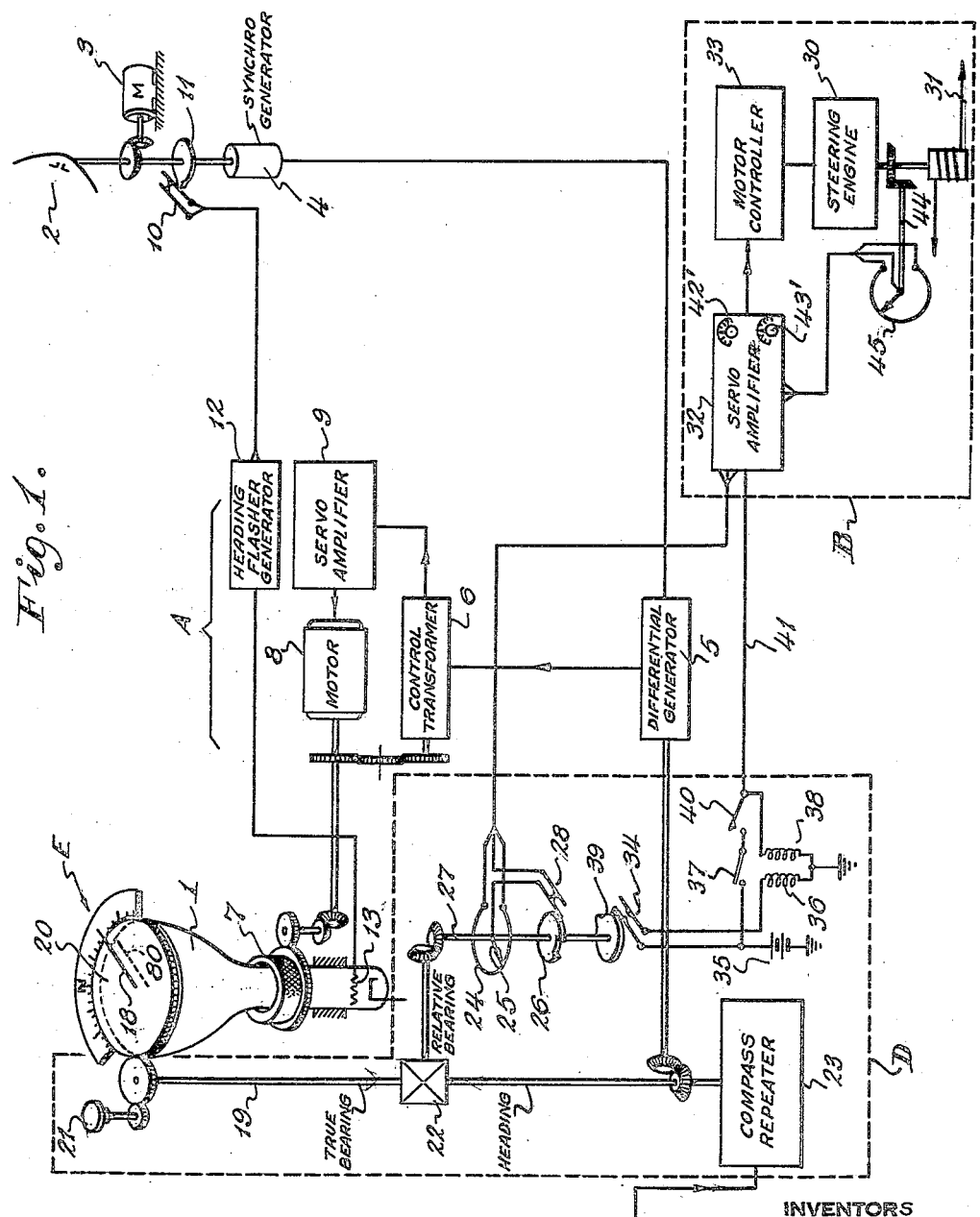
Fig. 1 is a schematic block diagram of an embodiment of the invention.
Figure 2:
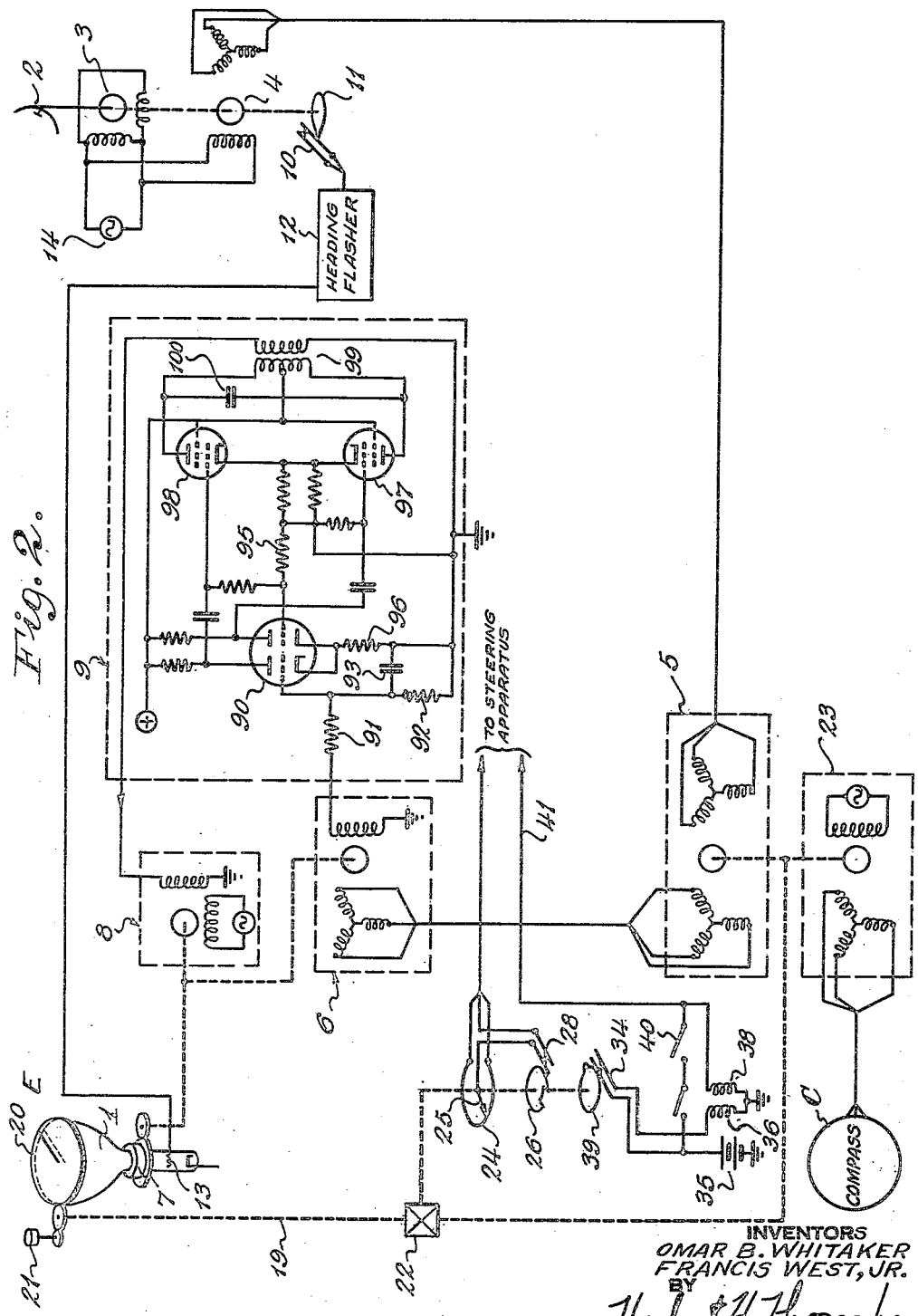
Fig. 2 is a schematic diagram of the embodiment of the invention shown in Fig. 1.

Fig. 1 illustrates a preferred embodiment of the invention. It combines a radar A, automatic steering apparatus B, a compass C, combining and adapting apparatus D, and a combined control indicator E. This combined control indicator E centers about the cathode ray tube 1, which is the P. P. I. radar indicator. Fig. 2 shows schematic circuit details of Fig. 1.

The radar components are conventional and are described briefly as follows. Only the components concerned with azimuth angle information are presented and the radio frequency components are not included. The radar antenna 2 may be continuously rotated by motor 3, and the instantaneous bearing of the antenna 2 relative to the ship's keel is transmitted by synchro generator 4 to differential generator 5. Differential generator 5 also receives craft heading information from the craft compass repeater 23 and it combines the relative bearing from the antenna 2 and the craft heading from the compass repeater 23 to provide true bearing of the antenna 2 direction. This true bearing information is connected to control transformer 6.

The azimuth angle of the radar antenna is provided at the cathode ray tube indicator 1 by rotatable deflection coils 7 which are adapted to be rotated about the neck of tube 1 through suitable gearing by motor 8. The motor 8 is actuated by servo amplifier 9 in response to the output of control transformer 6 in a conventional manner. The control transformer 6 combines the heading information received from differential generator 5 with the actual heading of the coils 7 and, if there is any discrepancy, energizes servo amplifier 9 in such a polarity to cause motor 8 to rotate the coil 7 to reduce the discrepancy to zero. Fig. 2 shows the schematic details.

The ship's heading is also flashed on the face of the tube 1 as follows. As the radar antenna 2 rotates, at the instant when it points in the direction of the ship's bow, the contacts of micro switch 10 are momentarily closed by a cam 11 mounted on the shaft of antenna 2. The momentary closing of the switch 10 triggers heading flasher generator 12 which supplies an intensification gate signal to the grid 13 of tube 1 in a conventional manner. Generator 12 may be a gate circuit such as a multivibrator. The result of this is that the ship's heading appears as a bright radial line 80 on the face of the indicator tube 1, and as the ship turns the line also rotates relative to the tube and to the representation of the surrounding objects. The video signals from the radar may be applied to the cathode or grid of cathode ray tube 1.

The automatic steering apparatus B is connected into the system as follows. A transparent rotatable disc 20 is superimposed upon the radar indicator 1. The disc 20 has engraved on it a radial line 18 for use as the ship's course selector, and is rotatable in response to the steering control knob 21. Other species of pointers and other types of guide lines may be used. The course selector disc 20 is mechanically connected to a mechanical differential 22 by shaft 19. The other input to the mechanical differential 22 is provided by compass repeater 23 which is connected to the ship's compass C. The two inputs to the mechanical differential 22 are therefore ship's heading and the true bearing of the course selector 20.

Since,

True bearing = heading + relative bearing the output of the mechanical differential will therefore be the relative bearing of the course selector 20. This relative output is mechanically connected to a circular potentiometer 24 which provides an electrical signal to the automatic steering apparatus B.

The details of the automatic steering apparatus B will be discussed later in the specification in connection with Fig. 3. It provides a steering engine 30, the output of which is connected to the ship's rudder by rudder cable 31. The steering engine is actuated by servo amplifier 32 and motor controller 33 in response to the electrical signals from the control potentiometer 24. Obviously, where the steering engine is an electric motor, controller 33 may be omitted and the motor driven from the output of amplifier 32. Adjustment knobs 42' and 43' will be discussed later.

There are several important safety synchronizing features which are necessary when interconnecting the various above-mentioned apparatus. First, provision must be made for limit stops because the resistance element of potentiometer 24 is not continuous about 360° of revolution. This is done by cut-out cam 26 mounted on potentiometer shaft 27. Cam 26 opens micro switch 28 when the pointer 25 comes to the end of the potentiometer winding 24 and the control circuit will be momentarily interrupted until the pointer moves away from the end of the potentiometer 24 winding. This will automatically ensue since the initial course change into the system will so actuate the rudder, as to move the potentiometer 24 contact arm in the proper direction to reestablish steering control.

The other safety synchronizing feature is necessary so that there will not be any discrepancy between the actual and selected ship's course, at the instant when the automatic steering apparatus is turned on by switch 40. In other words, if potentiometer 24 was not centered, there would be a rudder order signal when the automatic steering apparatus was turned on, and the ship would immediately start turning. This synchronizing arrangement is provided by cam 39, which is arranged to close the contacts of micro switch 34 only when the pointer 25 is at the mid-position of the potentiometer 24. When this is the case, a circuit is completed from battery 35, or alternatively an alternating current power supply, through the micro switch 34 to the starting switch relay coil 36, which when energized closes relay contacts 37. Contacts 37 are then held closed by coil 38, through the remote "on-off" switch 40 of steering apparatus 25.

Fig. 2 is a schematic diagram of the apparatus of Fig. 1. The transmission of angular information between the different components is accomplished in general by the use of selsyn transformers of commercially available types. Radar antenna motor 3 rotates the antenna 2 reflector and the cathode-ray tube deflection coil rotation is synchronized thereto by the servo circuit components. The motor 3 may be of the split-phase induction type and is energized by alternating current power source 14. In addition to rotating the antenna reflector, the motor 3 also drives synchro generator 4 which transmits the relative bearing of the antenna 2.

The alternating current power source 14 which energizes the motor 3 is also connected to the rotor of the synchro generator 4. The induced voltages in the Y-connected stator windings of synchro generator 4 are fed to the Y-connected stator windings of differential generator 5. The rotor winding of differential generator 5 is electrically connected to control transformer 6, and mechanically connected to compass repeater 23. Since "True" bearing is equal to "Heading" plus "Relative" bearing, the output of differential generator 5 to control transformer 6 is therefore the True bearing of antenna 2. Compass repeater 23 is a selsyn motor which is energized by the compass C selsyn transmitter. The compass repeater 23 may be a step by step motor in a ship, using that system.

The rotor of the control transformer 6 is positioned by servomotor 8 in the cathode-ray tube coil drive assembly. The error voltage induced in the control transformer 6 rotor winding is dependent on the voltages applied to its stator from differential generator 5 and the relative position of its stator and rotor. If the antenna 2 and sweep deflection coil 7 are oriented on the same true bearings, the error voltage is zero. If they are not oriented on the same true bearing, an error voltage is induced having a polarity which, when amplified by the servo amplifier 9 will drive the servomotor 8 in a direction that will tend to align the deflection coil 7 with the antenna 2 and so reduce the error voltage to zero.

A portion of the error voltage induced in the rotor coil of the control transformer 6 is applied to the grid of the first section of vacuum tube 90 which may be a 6SN7 tube in the servo amplifier 9. Resistors 91 and 92 form a voltage divider in the grid input circuit. Capacitor 93, which is connected in parallel with resistor 92, advances the phase of the 60-cycle error voltage by an amount necessary to make the servo amplifier 9 output voltage fed to one field winding of the servomotor 8, lead by approximately 90 degrees, the 115-volt A.-C. voltage fed to the other field. The full A.-C. output across the plate load resistor of the first half of tube 90 is capacity coupled to the grid of tube 98 which may be a 6V6 tube. The portion of the A.-C. output across resistor 95 is applied to the grid of the second half of tube 90 which functions as a phase inverter. The phase-inverter output is coupled to the grid of tube 97, which may be a 6V6 tube, operating in conjunction with tube 98 as a pushpull amplifier. The tubes 97 and 98 have load circuits composed of the primary of transformer 99 and capacitor 100. The capacitor 100 causes the circuit to approach resonance, and also short-circuits any noise or other high frequency voltages in the tube outputs. The output voltage in the secondary of the transformer 99 is fed to one field winding of the two-phase, induction servomotor 8 in order to properly position coil 7.

Figure 3:
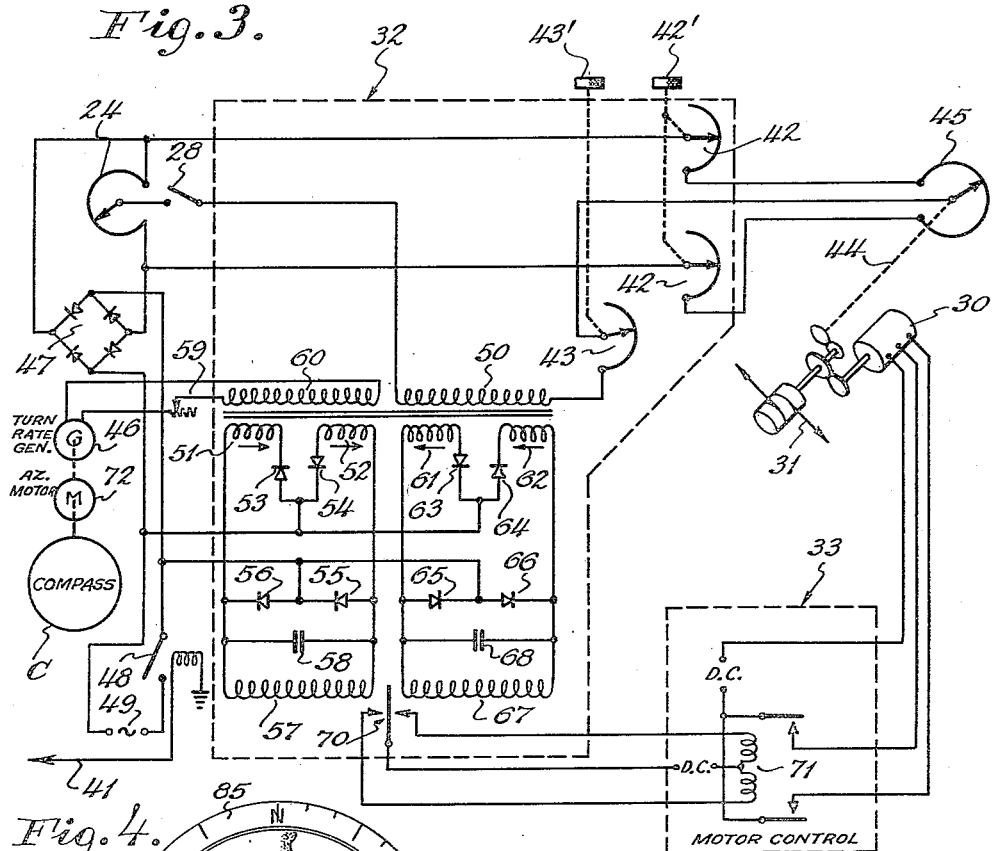
Fig. 3 is a schematic diagram of the automatic steering control apparatus and associated circuits.

Fig. 3 illustrates the automatic steering apparatus B and its associated control circuits. The automatic piloting and steering system disclosed herein is claimed in the copending application Serial No. 230,495 of Francis West, Jr., as a sole invention. That application is a continuation-in-part of the instant joint application. The automatic steering apparatus comprises generally an amplifier 32, a steering motor control 33, and a steering motor 30, the output of which is arranged to drive the rudder cable 31.

The amplifier 32 input circuit comprises a balanced bridge arrangement, including control potentiometer 24, previously discussed, rudder potentiometer 45 which is mechanically connected by shaft 44 to the output of the steering engine 30. Rudder potentiometer 45, is normally mounted on the steering engine 30, and is shown symmetrically with potentiometer 24, to illustrate the electrically balanced bridge input to amplifier 32. Potentiometer 43 in the input bridge circuit is a sensitivity adjustment controlled by knob 43' and is provided to make the sensitivity of the system variable to take care of changing weather conditions such as high seas and high wind. The double potentiometer 42 is connected to knob 42' and provides a rudder control adjustment. This adjustment varies the ratio of rudder angle to desired course change and is commonly known as the "rudder ratio." This adjustment depends upon rudder sensitivity of a particular ship installation.

The illustrated amplifier 32 is of the magnetic type although other types of amplifiers could be used. The balanced bridge input is connected to the input saturable reactor control winding 50 of amplifier 32. The current in the saturable reactor control winding 50 will be zero when the input bridge is in balance, and will reverse in either direction upon corresponding unbalance of the bridge. In other words, when the control potentiometer 24 does not balance the rudder feed back potentiometer 45, there will be an appropriate control input.

The current in reactor output windings 51 and 52 always flows in the same direction shown by arrows due to the arrangement of the associated rectifiers 53, 54, 55 and 56. The same is true of output coils 61 and 62 due to rectifiers 63, 64, 65 and 66. Therefore, according to conventional magnetic amplifier theory, the direct current core flux set up by the control winding 50 aids the current in one set of output windings, for instance 51 and 52, and opposes it in the other set 61 and 62, thereby providing an amplified signal which energizes either one of the oppositely polarized output coils 57 or 67, which in turn operate the differential relay 70. Filter capacitors 58 and 68 are provided for smooth output.

It has been found desirable to add to the embodiment of Fig. 1 a signal proportional to the rate of turn of the craft, for the purpose of reducing overshoot on turns and also for more precise course keeping. This rate signal may be provided by a rate generator 46 which is geared to the azimuth motor 72 of the compass C. The rate generator 46 may be a permanent magnet type generator having a D. C. output which changes polarity on reversal of ship's direction. When the ship deviates from its course, a signal proportional to the rate of turn is therefore generated by the rate generator 46. The output of generator 46 is connected to input coil 60 of magnetic amplifier 32, and a rate level adjustment potentiometer 59 is provided in the output leads of the rate generator 46 for attenuating the rate signal and the damping factor resulting therefrom. The magnetic amplifier 32 input reactors 50 and 60 provide a very convenient means of mixing two direct current signals so that the rudder responds to the resultant of the two signals.

The rate generator 46 operates as follows. In course keeping, when the ship deviates from its set course a rate signal is applied to the amplifier control winding 60. This rate signal aids the displacement input signal to control winding 50 and the result therefore is a leading rudder. On returning to the course the rate signal reverses and opposes the displacement signal. Therefore, the leading rudder anticipates the settling point, so that the ship coasts into the new heading with substantially zero rudder, thus preventing overshoot.

In turning to a new course, the rate signal opposes the displacement during the entire turn, and gives mid-ship rudder, or even opposing rudder if necessary, before the ship comes into the new course, to thereby provide substantially dead beat operation.

Alternating current power is supplied to the system by source 49 when relay switch 48 is energized by remote "on-off" switch 40 through lead 41. The A. C. power is converted to D. C. in selenium rectifier 47 for energizing the amplifier input bridge circuit.

The differential relay 70 energizes a power relay 71 in motor control 33 which actuates steering motor 30 in the desired direction. The shaft 44, connects to the steering engine positional output to rudder feed back potentiometer 45, to provide the error feed back signal to the amplifier 32 input bridge circuit.

Figure 4:
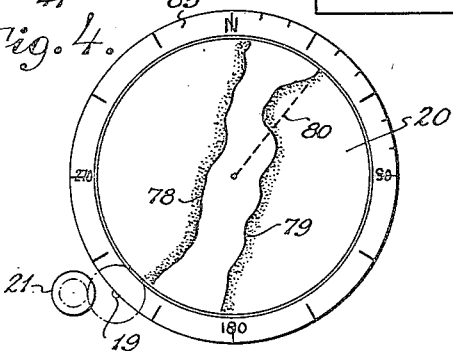
Figs. 4, 5 and 6 are representations of the combined control-indicator, illustrative of the operation of the invention.
Figure 5:
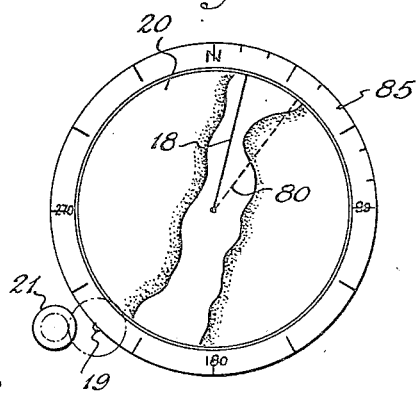
Figure 6:
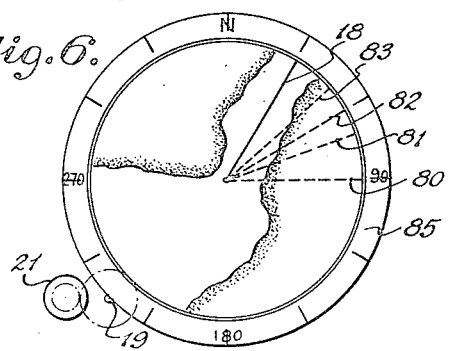

Figs. 4, 5 and 6 show typical radar representations of the P. P. I. type. Fig. 4 shows a representation of a river which is outlined by the river banks 78 and 79. The craft position is at the center, and the dotted line 80 shows the instantaneous craft heading which may be easily read on the circular azimuth scale 85. The P. P. I. presentation does not shift relative to the fixed circular scale 85 as the craft heading changes, because it is stabilized in azimuth by the craft compass. The course selector line (not shown) on the disc 20 is superimposed on the heading flasher 80, where the ship is on course.

Fig. 5 is similar to Fig. 4 except that the course selector line 18 for the automatic steering apparatus has been added. The course selector comprises a transparent rotatable disc 20 containing cursor line 18 which is mounted over the P. P. I. presentation and is adapted to be rotated by the knob 21. By turning knob 21 and cursor line 18 the desired course may be set with relation to the circular azimuth scale 85 and to the surrounding objects. As the disc selector 20 is rotated the new course information is transmitted by shaft 19 as described in connection with Figs. 1 and 2. In Fig. 5 a new course of approximately 015 has just been selected as shown by the position of the radial line 18. The instantaneous craft heading is still 038 as shown by the heading flasher line 80 and as the ship comes around to the new heading the dotted heading flasher 80 will gradually come to rest at the new heading of 015 under the course selector line 18. The craft may be guided solely from the surrounding objects, as in river navigation.

Fig. 5 illustrates how all the necessary information is presented on a single indicator in a simple manner. Both the instantaneous craft heading 80 and the new selected course 18 are indicated relative to the surrounding objects. If some unforeseen condition arises such as a high wind shifting the craft off its course, this condition will immediately become apparent and may be compensated for by moving the knob 21 to the correct course. With a system of this type it is easy and convenient to set in small course changes of a degree or so, which normally would not be made if the radar operator was required to call such small changes to the helmsman. It is not practical to coordinate individual radar operators and helmsman for such small changes. With the present invention it is convenient to make these small changes accurately, thereby assuring a finer control of the course. The radial line 18 on the disc may not extend all the way to the center of the disc, if it is desired to see close in targets more clearly. Other markings such as double lines, or range circles may be marked on the disc 20 if desirable.

Fig. 6 illustrates another advantage of the equipment which provides great assistance to the navigator in preventing overshooting when coming around to a new course. During a turn from 090 to 030 the radar indicator provides instantaneous headings 80, 81, 82, 83 and the control disc 20 provides an indication of the final desired heading 18. Instantaneous heading is flashed once per revolution of the radar antenna, for instance every 4 seconds. With these indications before him, the navigator can visually observe the rate of closure between the instantaneous ship's heading and the desired course 18 and by keeping a uniform rate of turn and slacking off a bit as the gap closes he will be able to come to the new heading with a minimum of over or under shooting. This advantage is in addition to any automatic rate control apparatus which may be incorporated in the automatic steering system.

The present invention combines and integrates all necessary information for determining the proper ship's course and also controls the course by means of a course selector which is integrally connected with both the craft compass and the radar indicator. By means of the present invention the routine procedure of conning a ship may be greatly streamlined and greatly increased both in speed and accuracy. It also greatly increases efficiency by eliminating at least one operator, many mental steps, and all verbal communications. By modern standards of instrumentation and time and motion study, the old routine procedure of conning a ship which depends on several operators and verbal communication, is outmoded.

An important advantage of the present invention is that the pilot may control the vessel entirely from the radar with reference to surrounding objects, which is especially important in river and harbor navigation. Since the radar instrument, or radar compartment, is generally darkened in order to obtain the greatest visual preception, therefore, it is not wise for the pilot to continually alternate between the darkened radar compartment and the lighted portion of the bridge, as it takes a matter of minutes for the human eye to function at the greatest efficiency and accommodate itself to the darkness at the radar instrument.

Another advantage is that the pilot does not have to estimate any angular deviations of course as both his instantaneous heading and his desired course are clearly indicated before him. The new course may be set with reference to any radar targets and the operator is advised when the vessel has reached the desired course by observing the radar heading flasher move to a position directly under the course selector line. All necessary information is automatically and continuously presented, so that a single navigator may easily interpret and employ it. Various alternatives may be used without departing from the scope of the invention, such as different arrangements of synchros or selsyns and different types of amplifiers, servo mechanisms, and differentials.

A stabilized cathode ray tube indicator might also be used as shown in copending application S. N. 42,807 in the name of Omar B. Whitaker entitled Combined P. P. I. Presentation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Craft navigation control means comprising a compass, radio object detecting means, a cathode ray tube indicator responsive to said object detecting means and said compass means to provide a presentation of the surrounding area in true bearing and to provide an indication of instantaneous craft heading in true bearing, a transparent control disc pointer superimposed on said cathode ray tube for indicating and controlling the desired true bearing course, automatic steering means, and means to connect said automatic steering means with said control disc and responsive to true bearing information from the control disc and craft heading information from the compass to provide relative bearing information of the new course to the automatic steering apparatus.

2. A craft radar pilot comprising a radio object detector, a compass, automatic steering apparatus, a combined control indicator, means responsive to said object detector and said compass to provide a true bearing representation on said control indicator of objects in the surrounding area, course selector index means connected to said control indicator to set in a desired true bearing course, means to convert said true bearing course to proper rudder angle and automatic steering means responsive to said converting means for turning the craft to the desired course.

3. A craft radar pilot comprising a radio object detector, a compass, automatic steering apparatus, a combined control indicator, means responsive to said object detector and said compass to provide a true bearing representation on said control indicator of objects in the surrounding area, course selector pointer means connected to said control indicator to set in and to indicate a desired true bearing course, means to convert said true bearing course to proper rudder angle, automatic steering means responsive to said converting means for turning the craft to the desired course, and means to synchronize said course selector and said automatic steering means to avoid turning the craft erroneously at the instant said automatic steering means is energized.

4. A craft radar pilot comprising a radio object detector, a compass, automatic steering apparatus, a combined control indicator, means responsive to said object detector and said compass arranged to provide a true bearing representation on said control indicator of objects in the surrounding area, a course selector transparent disc superimposed on said control indicator to indicate a desired true bearing course with reference to surrounding objects, means to convert said true bearing course to proper relative bearing, and automatic steering means including a servo amplifier and a steering engine responsive to said converting means for turning the craft to the desired course.

5. Craft navigation control means comprising a compass, radio object detecting means, a cathode ray tube indicator responsive to said object detecting means and said compass means to provide a presentation of the surrounding area in true bearing and to provide an indication of instantaneous craft heading in true bearing, a transparent control disc pointer superimposed on said cathode ray tube for indicating and controlling the desired true bearing course, automatic steering means, a potentiometer connected to said automatic steering means, said potentiometer having a wiper arm arranged to be displaced in proportion to the difference between true bearing and craft heading, a switch connected between said automatic steering apparatus and said potentiometer, and means operatively connected with said wiper arm to open said switch when said wiper arm is not in contact with said potentiometer.

6. Craft navigation control means comprising a compass, radio object detecting means, a cathode ray tube indicator responsive to said object detecting means and said compass means to provide a presentation of the surrounding area in true bearing and to provide an indication of instantaneous craft heading in true bearing, a transparent control disc pointer superimposed on said cathode ray tube for indicating and controlling the desired true bearing course, automatic steering means, a potentiometer connected to said automatic steering means, said potentiometer having a wiper arm arranged to be displaced in proportion to the difference between true bearing and craft heading, means to disable said automatic steering apparatus when said craft navigation control means is not in operation, and means operatively connected to said disabling means and responsive to the positioning of said wiper arm to maintain said automatic steering apparatus in a disabled state until said wiper arm is positioned at a predetermined neutral point on said potentiometer.

References Cited in the file of this patent

UNITED STATES PATENTS

| Number | Name | Date |
| --- | --- | --- |
| 2,120,950 | Hodgman | June 14, 1938 |
| 2,209,191 | Dearing | July 23, 1940 |
| 2,315,755 | Warner | Apr. 6, 1943 |
| 2,399,671 | Gage | May 7, 1946 |
| 2,419,970 | Roe | May 6, 1947 |
| 2,420,016 | Sanders | May 6, 1947 |
| 2,448,007 | Ayres | Aug. 31, 1948 |
| 2,480,068 | Wolff | Aug. 23, 1949 |
| 2,480,829 | Barrow | Sept. 6, 1949 |
| 2,482,809 | Thompson | Sept. 27, 1949 |
| 2,489,251 | Anast | Nov. 29, 1949 |
| 2,499,349 | Ayres | Mar. 7, 1950 |
| 2,573,021 | Higinbotham | Oct. 30, 1951 |

FOREIGN PATENTS

| Number | Country | Date |
| --- | --- | --- |
| 591,322 | Great Britain | May 10, 1947 |